G. W. FERDON.
SINK REFUSE SHOVEL.
APPLICATION FILED JUNE 13, 1919.
1,367,032.
Patented Feb. 1, 1921.
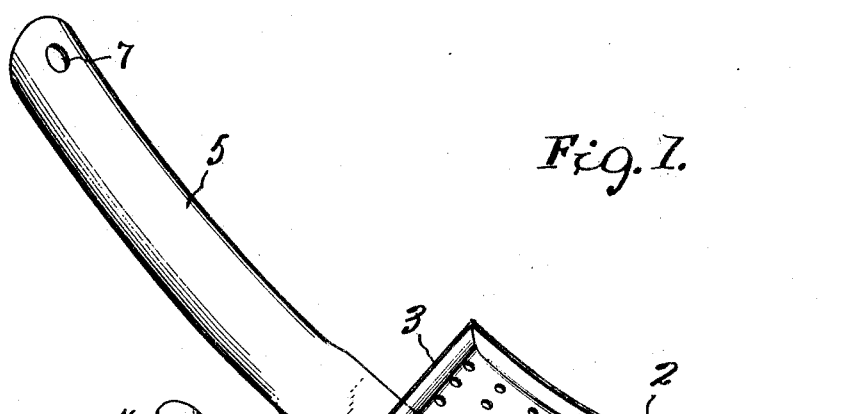
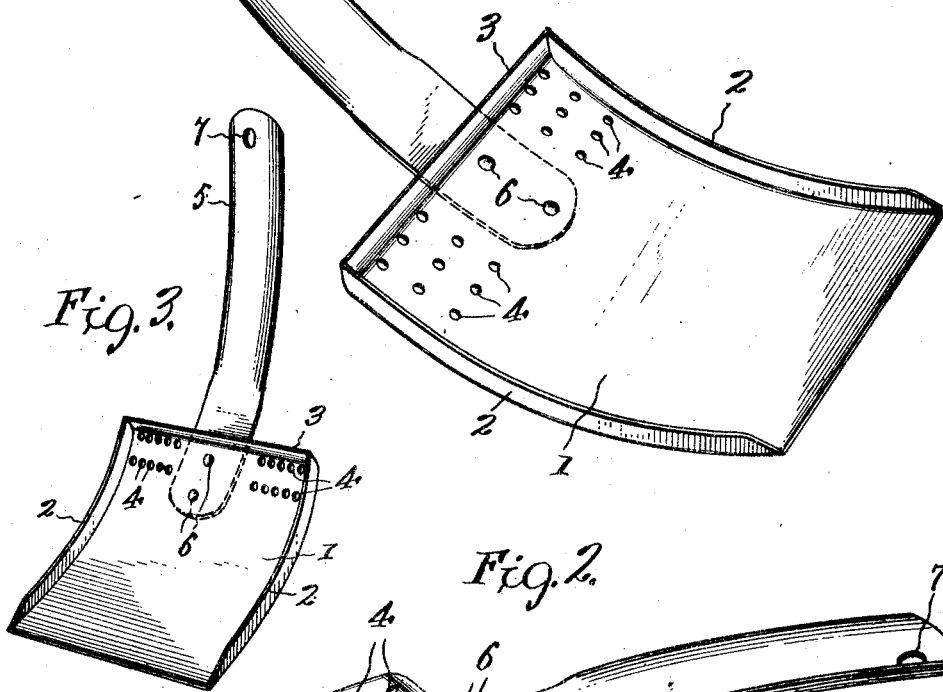
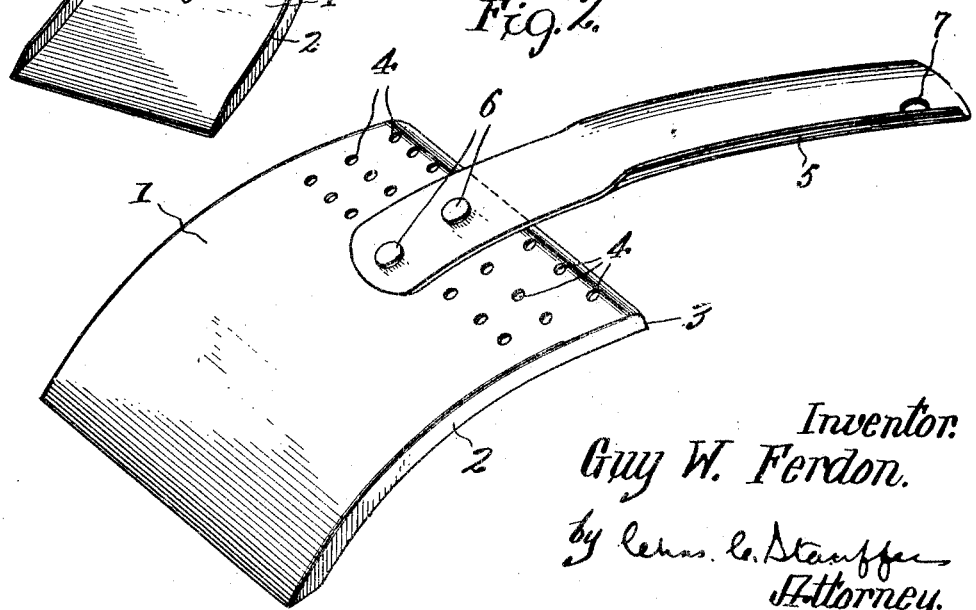
Inventor:
Guy W. Ferdon.
by Chas. C. Stauffer
Attorney.

UNITED STATES PATENT OFFICE.

GUY W. FERDON, OF CRESSKILL, NEW JERSEY.

SINK-REFUSE SHOVEL.

1,367,032.	Specification of Letters Patent.	Patented Feb. 1, 1921.

Application filed June 13, 1919. Serial No. 304,040.

*To all whom it may concern:*

Be it known that I, GUY W. FERDON, a citizen of the United States, residing at Cresskill, county of Bergen, State of New Jersey, have invented certain new and useful Improvements in Sink-Refuse Shovels; and I do hereby declare the following to be a full, clear, and exact description of the invention, such as will enable others skilled in the art to which it appertains to make and use the same.

My invention relates to sink refuse shovels, *i. e.*, tools or implements intended particularly to aid in and facilitate the removal of refuse, garbage, and trash of the kind that tends to accumulate in the bottom of a kitchen sink or similar receptacle during the process of preparing food for cooking, cleaning off the refuse from used dishes and pans, and during dish-washing, etc.

Frequently there is left in a kitchen sink in the course of preparing and washing food, cleansing dishes, emptying coffee pots, and so on, quantities of refuse, some of which is composed of comparatively small particles, such as the scrapings of new potatoes, strings of string beans, corn silk, grounds of drip coffee, etc. Such items of refuse are too fine and pulpy to be picked up by the fingers or by implements ordinarily available, and are liable to be washed down the drain pipe, the gooseneck or other parts of which they sometimes obstruct and clog, particularly if the cook is hasty or careless, and thus occasion great annoyance. The pipe has sometimes to be cut and a new section put in at great inconvenience and expense.

I have devised a tool which minimizes or negatives the difficulty just referred to. By means of my device a cook is able to scrape a sink clean to the last grain of refuse, and put that refuse, comparatively dry, into a garbage can, with little trouble or delay and with little danger of any insoluble granules escaping into the drain pipe. My device automatically separates the solid from the liquid portion, which is carried off through the drain, and as the mass is sometimes made up of more liquid than solid and is in a semi-pulpy state, this is a matter of serious importance.

I have devised an improved scraper or shovel by means of which the last traces can easily be removed from the floor of the sink and the latter left absolutely clean and free from disease breeding spots of contamination.

In the drawings:

Figure 1 is a front view;

Fig. 2 is a rear view of the shovel; and

Fig. 3 a view of a modified form.

In the drawings, 1 represents the blade or body of the scraper or shovel. On the sides the blade is provided with the edges or flanges 2, and at the rear with the rear flange 3. The rear part of the blade is provided with a series of small perforations 4, and a flanged handle 5 is provided riveted to the blade by rivets 6, and with a hole 7 by means of which it may be suspended. This handle is riveted in the region of the groups of perforations, to the base or blade.

One characteristic of my shovel or scraper is that it is made on a curve or arc extending throughout the tool. This curve is extended to the side flanges, as clearly shown in Fig. 2. That is, I prefer that the flanges be bent, as shown, rather than crinkled or corrugated, as frequently happens when sheet metal is bent in its own plane. I thus avoid any recesses or creases to harbor dirt and germs, as all the surfaces are smooth and continuous.

The body of the shovel, it will be noted, is longer than wide. Its rounded shape renders it useful in scraping the rounded corners of a sink.

The handle is practically a continuation in whole or in part of the curve or arc though, of course, not necessarily on the same radius or on a curve of the same mathematical kind. The radius of the curve is from 10 to 15 inches, or about the radius of movement of the forearm with the elbow as a pivot. It is realized, of course, that this may be varied, but a radius within the limits indicated is one to which most arms can adapt themselves readily.

The hands of the user are kept free from contact with the sink, and a sweeping forward movement should be employed in the scraping act. The refuse is carried back on the shovel, and any fluid swishes to the upper part of the blade and escapes through the openings, leaving sediment behind on the shovel.

It will be noted that the shape of the handle renders contact of the knuckles of the user with the bottom of the sink difficult and improbable. At the same time the same curve permits the forward end of the scraper to be carried or swung upward to avoid dripping or flowing of the refuse over the forward edge.

Using the reverse side enables one to compact and pat a mass of refuse into a pile for easy removal, and if the upper side be used the flanges score the mass and assist in the escape of moisture. The tool may be employed sidewise with a circular sweeping movement, bringing the refuse toward the user for quick removal. In the form shown in Fig. 3, but two rows of holes 4 are shown arranged close together, and near the end flange 3.

By the use of a curve I am able to bring merely a small section of the tool into contact with the sink, and this aids in adding to the life of the sink, particularly if it be porcelain.

The shovel may be grasped, with the palm either up or down.

I have invented a simple tool well adapted to the purpose, substantially smooth, of metal throughout, thus avoiding the use of felt or rubber strips; one which in use enables the user to keep her hands from contact with the sink or with refuse, and one which, by its shape and structure, readily frees a soppy mass from most of its moisture during the act of scraping it up. The shovel, it is thus seen, is substantially a section of the walls of a cylinder of 20 to 30 inches in diameter.

The curved bottom surface permits the practice of a sort of rocking motion when in use. That is, the hand is at first held high so that the front edge only acts, at the beginning of the stroke. The water swirls back through the holes which are, as shown, preferably made in the rear only of the blade, so that any current is toward the rear mainly and this tends to help keep any semi-pulpy mass on the shovel. The necessary tilting of the shovel to bring the perforations lowermost also helps in this. At the end of the stroke the shovel is rocked on its bottom by depressing the handle somewhat, and this helps to retain the mass on the shovel, the side and rear flanges also helping in this. The same motion also aids in the further discharge of water.

Having thus described my invention, what I claim as new and desire to secure by Letters Patent of the United States, is:

1. In a sink shovel in combination, a longitudinally curved base perforated toward the rear, and imperforate in the middle and front part, vertical curved side flanges and a rear flange integral with the base, the base, side and rear flanges being stamped from a single piece of sheet metal, and a flanged handle secured to the curved base, and arranged to continue the curve thereof.

2. In a sink shovel, in combination, a longitudinally curved base, perforated in the rear, imperforate side and rear flanges for said base, and a curved handle riveted to the base at the rear and continuing the curve of the base.

3. In a sink-shovel, in combination, a base perforated at the rear, and a handle riveted to said base, said handle and base having side and rear flanges, the handle and base being curved substantially in the plane of the side flanges whereby the shovel may be rocked backward on its bottom to discharge draining water through the perforations in the rear, while retaining pulpy refuse on the shovel, without danger or injury to the knuckles of the operator.

4. In a sink-shovel, in combination, a base perforated in the rear and a handle riveted to said base, said handle and base having side and rear flanges, the handle and base being curved substantially in the plane of the side flanges all on substantially the radius of movement of a human fore-arm whereby, on the forward movement of the scraper, the imperforate forward end may be readily swung forward and upward, thereby facilitating discharge of liquid through the perforations and preventing the escape of refuse over the forward edge of the shovel.

In testimony whereof, I affix my signature.

GUY W. FERDON.